United States Patent
Wang

(10) Patent No.: US 7,505,069 B2
(45) Date of Patent: Mar. 17, 2009

(54) METHOD AND APPARATUS FOR MAINTAINING CONSISTENT WHITE BALANCE IN SUCCESSIVE DIGITAL IMAGES

(75) Inventor: Yu-Wei Wang, Fort Collins, CO (US)

(73) Assignee: Hewlett-Packard Development Company, L.P., Houston, TX (US)

(*) Notice: Subject to any disclaimer, the term of this patent is extended or adjusted under 35 U.S.C. 154(b) by 581 days.

(21) Appl. No.: 11/259,848

(22) Filed: Oct. 26, 2005

(65) Prior Publication Data
US 2007/0091184 A1    Apr. 26, 2007

(51) Int. Cl.
 H04N 9/73    (2006.01)
 G06K 9/00    (2006.01)

(52) U.S. Cl. .................. 348/223.1; 382/165

(58) Field of Classification Search ............. 348/223.1, 348/655; 382/165, 166, 181, 218, 209, 217, 382/220, 190, 251, 253, 162, 167, 219; 358/515, 358/516; 375/240.16
See application file for complete search history.

(56) References Cited

U.S. PATENT DOCUMENTS

| | | | | |
|---|---|---|---|---|
| 5,270,802 A * | 12/1993 | Takagi et al. | ................. | 348/655 |
| 5,659,357 A * | 8/1997 | Miyano | ................... | 348/223.1 |
| 5,874,988 A * | 2/1999 | Gu | ................ | 348/97 |
| 6,160,579 A * | 12/2000 | Shiraiwa et al. | ........... | 348/224.1 |
| 6,690,828 B2 * | 2/2004 | Meyers | ........................ | 382/218 |
| 6,751,354 B2 * | 6/2004 | Foote et al. | .................. | 382/224 |
| 6,791,606 B1 * | 9/2004 | Miyano | ................... | 348/223.1 |
| 6,927,792 B1 * | 8/2005 | Mimura et al. | ........... | 348/223.1 |
| 6,965,401 B1 * | 11/2005 | Takei | ....................... | 348/225.1 |
| 7,016,549 B1 * | 3/2006 | Utagawa | ...................... | 348/237 |
| 7,031,406 B1 * | 4/2006 | Li et al. | ....................... | 375/341 |
| 7,098,944 B1 * | 8/2006 | Shiraiwa et al. | ........... | 348/222.1 |
| 7,158,174 B2 * | 1/2007 | Gindele et al. | ........... | 348/224.1 |
| 7,236,627 B2 * | 6/2007 | Takahashi | .................... | 382/162 |
| 7,286,703 B2 * | 10/2007 | Kaku | .......................... | 382/167 |
| 7,355,636 B2 * | 4/2008 | Takeuchi | .................. | 348/223.1 |
| 7,356,190 B2 * | 4/2008 | Mizoguchi et al. | ........... | 382/233 |
| 2002/0118967 A1 * | 8/2002 | Funston | ...................... | 396/155 |
| 2005/0052294 A1 * | 3/2005 | Liang et al. | .................... | 341/63 |
| 2005/0122408 A1 * | 6/2005 | Park et al. | ................. | 348/223.1 |
| 2006/0153422 A1 * | 7/2006 | Tapson et al. | ................ | 382/100 |

FOREIGN PATENT DOCUMENTS

JP    06-233333    *  8/1994    .............. 348/223.1

* cited by examiner

*Primary Examiner*—Lin Ye
*Assistant Examiner*—Marly Camargo

(57) ABSTRACT

Consistent white balance between successive similar digital images of a scene is provided by comparing the digital images and, if they are sufficiently similar, maintaining substantially the same white balance setting in a second digital image as in a first digital image. The method is applicable to, for example, mixed-illuminant situations and may be implemented in both still-capture and video digital imaging devices.

24 Claims, 9 Drawing Sheets

|  | FIRST DIGITAL IMAGE (IS1) | SECOND DIGITAL IMAGE (IS2) | COMPOSITE ILLUMINANT SCORES | | |
|---|---|---|---|---|---|
|  |  |  | BIAS=1.2 | BIAS=10 | BIAS=0.1 |
| ILLUMINANT 1 | 45 | 40 | 42.73 | 44.55 | 40.45 |
| ILLUMINANT 2 | 95 | 95 | 95 | 95 | 95 |
| ILLUMINANT 3 | 100 | 70 | 86.36 | 97.27 | 72.73 |
| ILLUMINANT 4 | 80 | 45 | 64.09 | 76.82 | 48.18 |
| ILLUMINANT 5 | 60 | 100 | 78.18 | 63.64 | 96.36 |

COMPOSITE ILLUMINANT SCORE = (BIAS*IS1 + IS2)/(BIAS + 1)

FIG. 6D

METHOD AND APPARATUS FOR MAINTAINING CONSISTENT WHITE BALANCE IN SUCCESSIVE DIGITAL IMAGES

FIELD OF THE INVENTION

The present invention relates generally to digital photography and more specifically to techniques for controlling white balance in digital images.

BACKGROUND OF THE INVENTION

Most digital imaging devices such as digital cameras or digital camcorders include some kind of automatic white balance algorithm. The digital imaging device attempts to determine the type of illuminant present in a scene and selects the "white point" accordingly. The white point is the reference color that represents white and with respect to which all other colors in a particular image are calculated. The decision of what kind of illuminant is present is based solely on the current image.

A problem arises, however, when more than one type of illuminant is present in a scene. For example, a room may be illuminated in part by fluorescent lighting and in part by sunlight shining through a window. If successive similar digital images of such a scene are captured, the white balance may end up being inconsistent from image to image because the digital imaging device may set the white balance based on one type of illuminant in one image and a different illuminant in a successive image. This inconsistency in white balance is especially troublesome in live preview and video applications.

It is thus apparent that there is a need in the art for a method and apparatus for maintaining consistent white balance in successive digital images.

BRIEF DESCRIPTION OF THE DRAWINGS

FIG. 6D is a table illustrating one manner of computing a composite illuminant score in connection with the method shown in FIG. 6C, in accordance with an illustrative embodiment of the invention.

DETAILED DESCRIPTION OF THE INVENTION

Consistent white balance can be maintained between similar successive digital images by comparing the images and maintaining substantially the same white balance in the second image as that of the first image, if the similarity between the images satisfies certain predetermined criteria. This technique can be applied to live preview, still images, and video. Furthermore, the technique can be implemented with relatively low complexity and overhead in a digital imaging device.

Figure 1A:
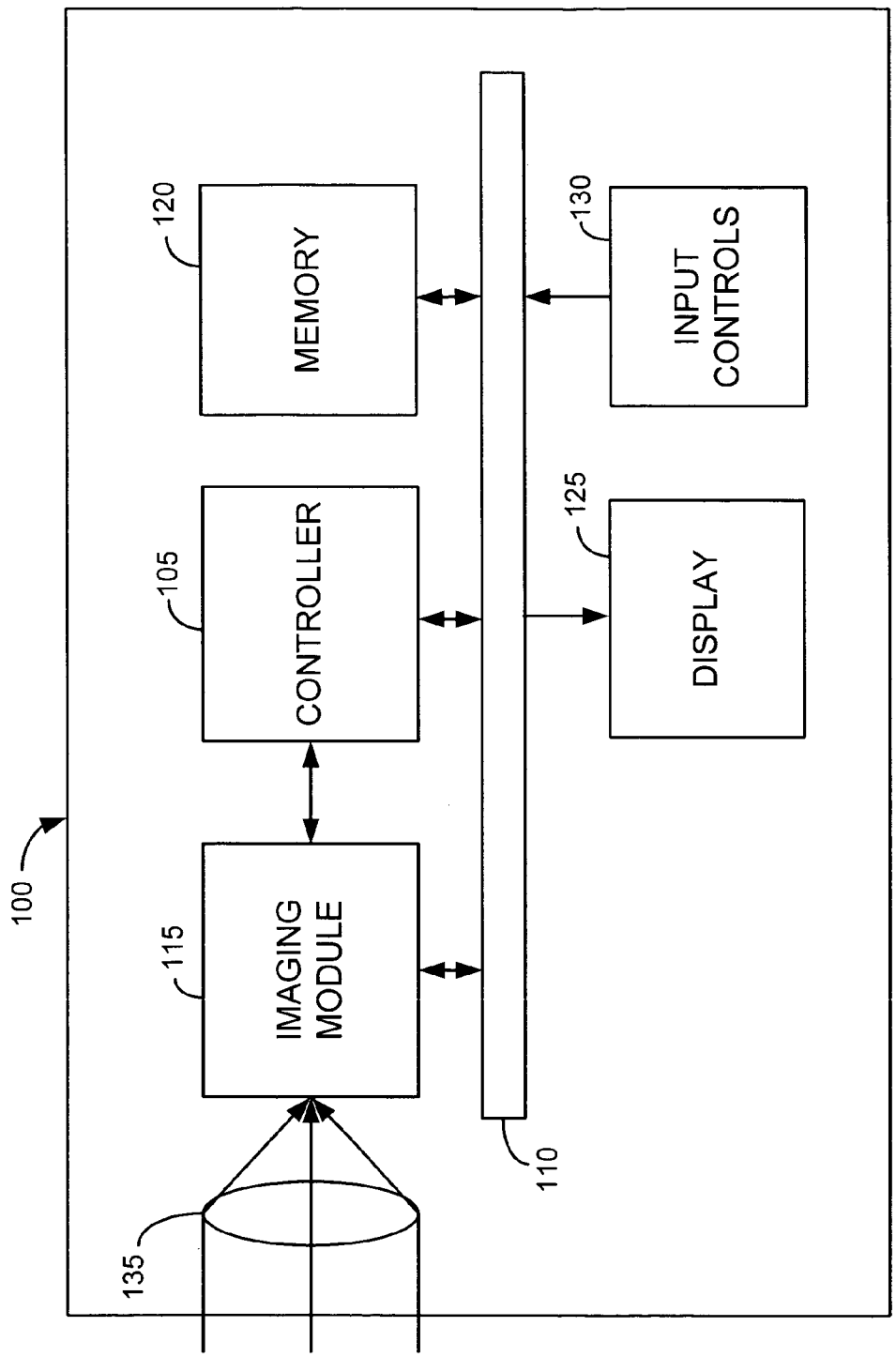
FIG. 1A is a functional block diagram of a digital imaging device in accordance with an illustrative embodiment of the invention.

FIG. 1A is a functional block diagram of a digital imaging device 100 in accordance with an illustrative embodiment of the invention. Digital imaging device 100 may be any device capable of converting an optical image of a scene to a digital image. Examples include, without limitation, digital cameras, digital camcorders, personal digital assistants (PDAs) with digital camera functionality, and radiotelephones (e.g., cellular or PCS phones) with digital camera functionality. In FIG. 1A, controller 105 (e.g., a microprocessor or microcontroller) may communicate over data bus 110 with imaging module 115, memory 120, display 125, and input controls 130. Display 125 may be, for example, a liquid crystal display (LCD). Optical system 135 produces optical images that are converted to digital images by imaging module 115. Input controls 130 may include a shutter button, navigational buttons for browsing menus and captured digital images, and other input controls for controlling the operation of digital imaging device 100.

Figure 1B:
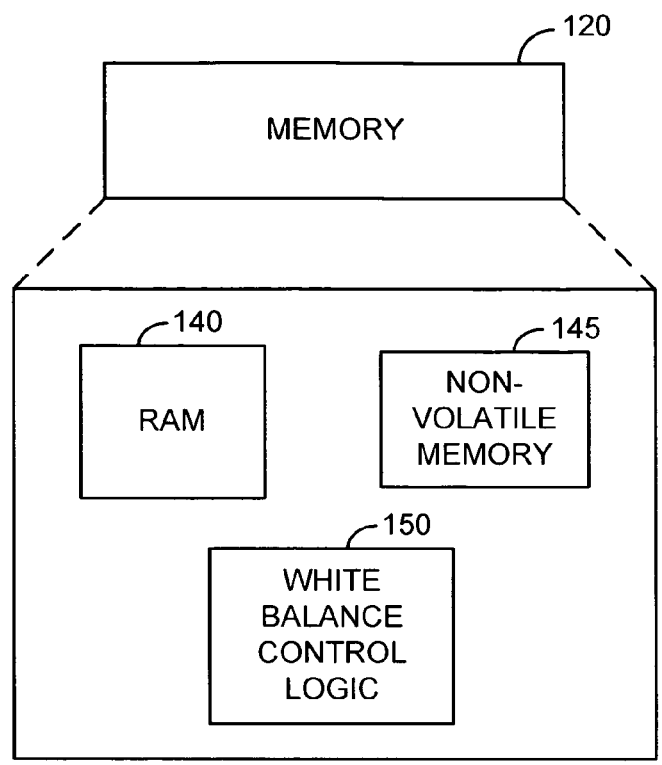
FIG. 1B is a functional diagram of a memory of the digital imaging device shown in FIG. 1A in accordance with an illustrative embodiment of the invention.

FIG. 1B is a functional diagram of memory 120 in accordance with an illustrative embodiment of the invention. Memory 120 may comprise random access memory (RAM) 140, non-volatile memory 145, and white balance control logic 150. In some applications, non-volatile memory 145 may be of the removable variety (e.g., a secure digital or multi-media memory card). The functionality of white balance control logic 150 will be described in greater detail in later portions of this detailed description. In general, white balance control logic 150 controls the setting of white balance in digital imaging device 100. Though shown as an aspect of memory 120 in the illustrative embodiment of FIG. 1B, the functionality of white balance control logic 150 may be implemented in software, firmware, hardware, or any combination thereof. In one illustrative embodiment, white balance control logic 150 comprises firmware that is executed by controller 105.

Figure 2:
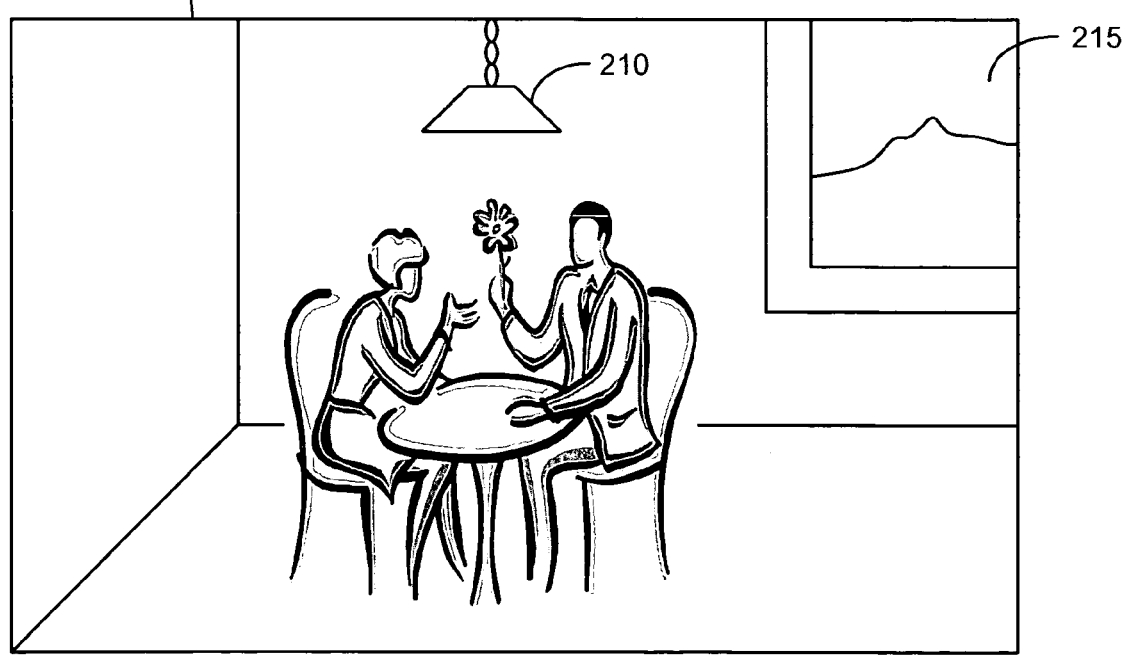
FIG. 2 is an illustration of a simplified digital image of a scene in which mixed illuminants are present, in accordance with an illustrative embodiment of the invention.

FIG. 2 shows one example of the context in which a need for the invention arises. FIG. 2 is an illustration of a simplified digital image 205 of a scene in which mixed illuminants are present, in accordance with an illustrative embodiment of the invention. In FIG. 2, the scene (a room containing two human subjects) is illuminated by both incandescent light 210 and sunlight through window 215. When a digital image of such a scene is captured, digital imaging device 100 decides upon which of the two illuminants to base the white balance setting.

This choice can, in some embodiments, be influenced by input from a user. For example, the user may cause digital imaging device 100 to concentrate on a particular portion of the scene in performing its white balance measurements. It is desirable to keep that choice of white balance consistent in subsequent similar digital images that are captured of the same scene. Otherwise, the walls of the room depicted in FIG. 2 may end up having a hue in one image that is inconsistent with that in a very similar image captured at nearly the same time. This problem may be overcome by measuring the similarity between the digital images and, if the images are sufficiently similar, maintaining a white balance in the later image that is consistent with that of the earlier image.

There are a variety of techniques for comparing digital images to measure their similarity. Such techniques are well known to those skilled in the digital photography art. Regardless of the method, such comparisons may be performed using first and second digital images to which no white balance adjustment has yet been applied. One approach involving probability vectors is shown in FIGS. 3A and 3B, in accordance with an illustrative embodiment of the invention.

Figure 3A:
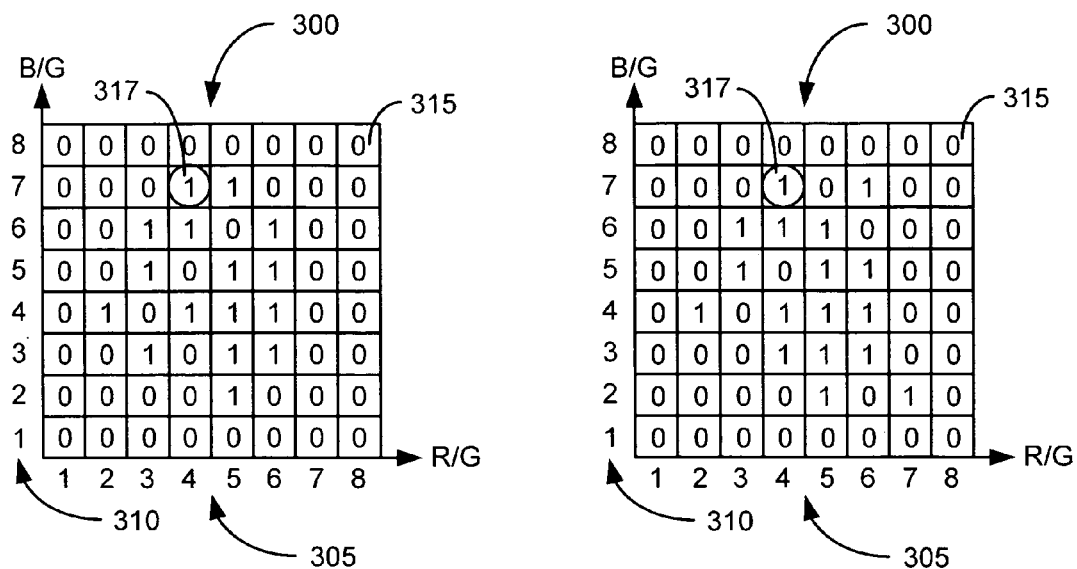
FIG. 3A is a diagram of two binary probability vectors associated with first and second digital images, respectively, in accordance with an illustrative embodiment of the invention.

In FIG. 3A, binary probability vectors associated with first and second digital images, respectively, are shown. For example, the first digital image may be a previous (earlier) image of a scene captured shortly before the second digital image. Each probability vector may be constructed as follows. First, assuming the first and second digital images are in RGB (demosaiced) format, the color ratios R/G and B/G may be computed for each pixel in the image. Secondly, the color ratios R/G and B/G may be quantized into quantization levels 305 and 310, respectively. The number of quantization levels 305 and 310 has been limited to eight for purposes of illustration in FIGS. 3A and 3B. In an actual implementation, the color ratios may be quantized to 64 levels, for example. Finally, the quantized color ratios R/G and B/G may be used, for each pixel, as indices to specify a unique location 315 in two-dimensional binary probability vector 300. A first binary symbol (e.g., "1," as shown in FIG. 3A) may be recorded in the unique location 315 corresponding to each combination of indices that occurs within the digital image. The remaining locations 315, corresponding to combinations of indices that do not occur, may be filled with a second binary symbol (e.g., "0," as shown in FIG. 3A) that is logically opposite the first binary symbol. Those skilled in the art will recognize that the polarities of the binary symbols may be reversed without consequence, so long as consistency of interpretation is maintained.

Once the binary probability vectors 300 have been generated as shown in FIG. 3A, they may be used to measure the similarity between the associated first and second digital images. The binary probability vectors 300 may be compared to determine for how many locations 315 both probability vectors contain the first binary symbol ("1" in FIGS. 3A and 3B). Such locations 315 may be termed "matching locations" 317, one example of which is shown in FIG. 3A (circled). The matching locations 317 correspond to matching occurrences of color ratios R/G and B/G between the two binary probability vectors 300, indicating similarity between the two underlying digital images. In FIG. 3A, For example, the binary probability vectors 300 shown in FIG. 3A (which one goes with which digital image is arbitrary in this example) have 13 such matching locations 317. Dividing the number of matching locations 317 (13) by the number of first binary symbols contained in the probability vector 300 having the greater number of first binary symbols (17, in the rightmost probability vector 300 in FIG. 3A) yields a similarity score of 13/17 or approximately 0.765, which may be expressed as a percentage similarity of 76.5%. The divisor of the similarity score is chosen as just explained to ensure that the similarity score is normalized to a maximum value of unity.

Figure 3B:
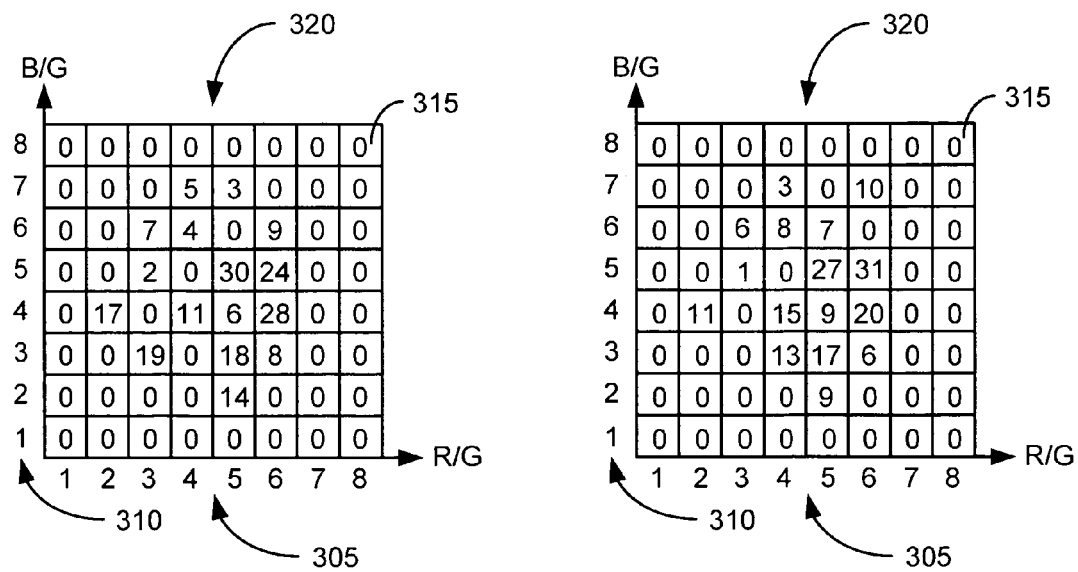
FIG. 3B is a diagram of two integer probability vectors associated with first and second digital images, respectively, in accordance with an illustrative embodiment of the invention.

FIG. 3B illustrates that integer probability vectors 320 may be used instead of the binary probability vectors of FIG. 3A. Instead of recording a first binary symbol in each location 315 corresponding to the combinations of quantized color ratios R/G and B/G that occur in the applicable digital image, the number of occurrences of each combination of quantized color ratios is recorded. That is, an integer probability vector 320 is similar to a two-dimensional histogram of the color ratios R/G and B/G. The computation of a similarity score is slightly different from that explained above in connection with binary probability vectors 300. Here, the number of overlapping occurrences between the two integer probability vectors 320 may be normalized by the total number of pixels in either underlying digital image. For example, in FIG. 3B, the left integer probability vector 320 contains 18 occurrences at the location 315 having coordinates (5,3). At that same location, the right integer probability vector 320 contains 17 occurrences. Therefore, the overlap between the two sets of occurrences is 17 (i.e., the two integer probability vectors 320 have 17 occurrences in common at that location 315). The similarity score associated with integer probability vectors 320 may also be expressed as percentage similarity. For example, in FIG. 3B, there are 145 overlapping occurrences of color-ratio combinations between the two integer probability vectors 320. That number, when divided by the total number of pixels in the subject digital image yields a similarity score. For example, if the underlying digital images were each 10×19 pixels in size (a greatly simplified example), the similarity score would be 145/190 or 0.763.

One advantage of an implementation using probability vectors as in FIGS. 3A and 3B is that it does not require a spatial comparison of the digital images. Also, basing the similarity determination on color ratios R/G and B/G accounts for exposure variation between the first and second digital images.

To reduce processing overhead and, therefore, to speed up similarity measurements, reduced-resolution digital images may be created from the original digital images, and the reduced-resolution digital images may be compared instead of the original full- or higher-resolution digital images. For example, for a full-resolution 2800×2200-pixel digital image, a 200×160-pixel reduced-resolution digital image may be created for comparison purposes. Comparing such reduced-resolution digital images results in a relatively minor processing burden for digital imaging device 100 and provides some built-in low-pass filtering of image noise.

Figure 4:
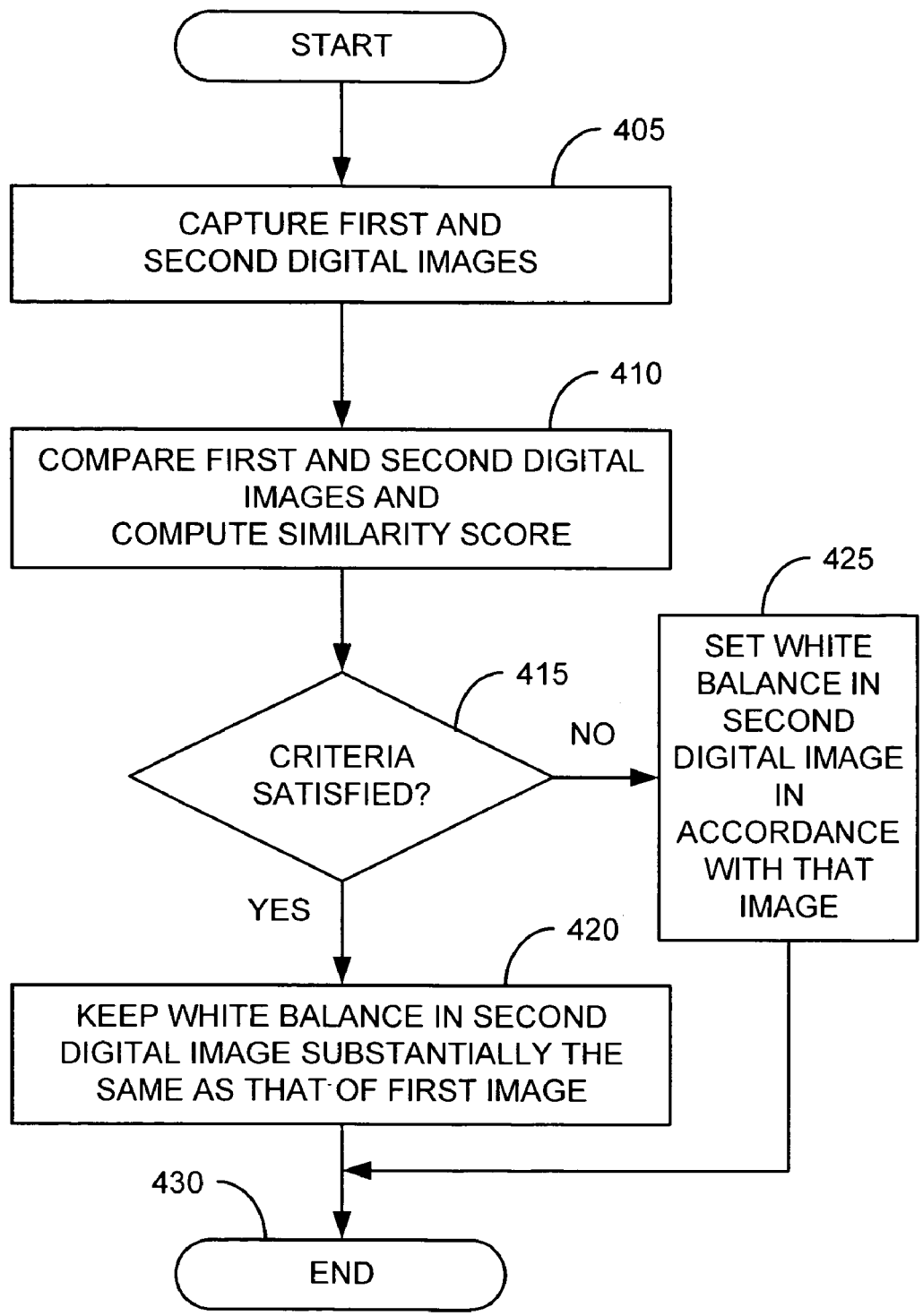
FIG. 4 is a flowchart of the operation of the digital imaging device shown in FIGS. 1A and 1B in accordance with an illustrative embodiment of the invention.

FIG. 4 is a flowchart of the operation of digital imaging device 100 shown in FIGS. 1A and 1B in accordance with an illustrative embodiment of the invention. At 405, first and second digital images of a scene may be captured. As explained above, these first and second digital images may, in some embodiments, be reduced in resolution to speed up image comparison. At 410, white balance control logic 150 may compare the first and second digital images and compute a similarity score that indicates the degree of similarity between the first and second digital images. White balance control logic 150 may then determine, at 415, whether the similarity score satisfies predetermined criteria. If so, the process proceeds to 420, where white balance control logic 150 may maintain consistency in white balance between the first and second digital images by keeping the white balance setting in the second digital image substantially the same as that of the first digital image. If not, the process proceeds to 425, where white balance control logic 150 may instead set the white balance of the second digital image in accordance with illuminant measurements made in connection with that image only. At 430, the process may terminate.

Figure 5:
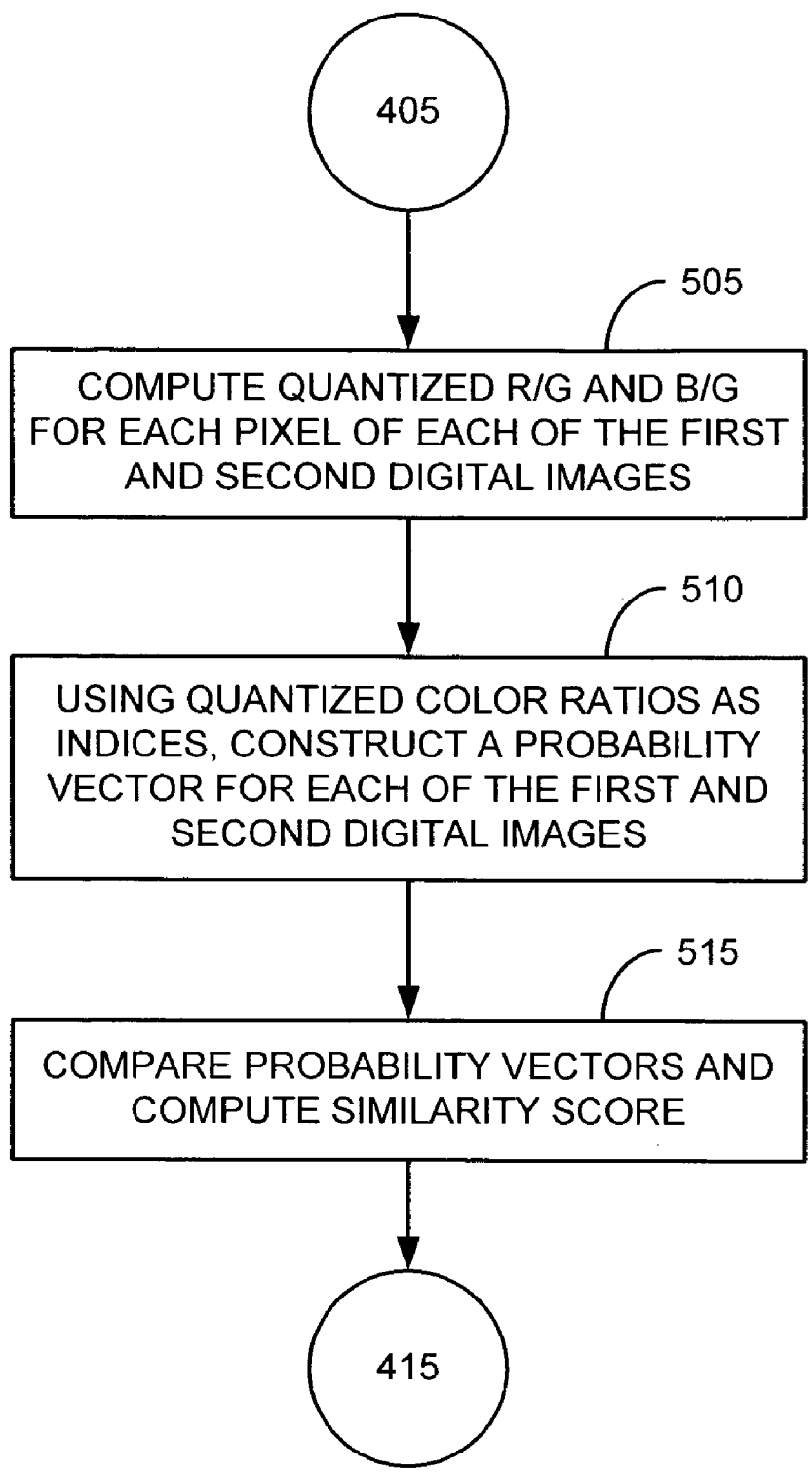
FIG. 5 is a flowchart of a method for comparing digital images in accordance with an illustrative embodiment of the invention.

As explained above, a variety of techniques may be used to measure similarity between the first and second digital images. FIG. 5 is a flowchart of a method for comparing digital images in accordance with an illustrative embodiment of the invention. From step 405 in FIG. 4, white balance control logic 150 may compute color ratios R/G and B/G for each pixel of each digital image at 505. At 510, white balance control logic 150 may use the quantized color ratios R/G and B/G for each pixel as a set of indices (coordinates) to construct a probability vector for each digital image, as described above. As explained above, the probability vectors may be binary (300) or integer (320). At 515, the resulting probability vectors may be compared, and a similarity score (e.g., a percentage similarity) may be computed. The process may then proceed to step 415 in FIG. 4.

Once a similarity score has been computed, there are a variety of ways in which such side information can be used to maintain consistent white balance between digital images. Specifically, differing predetermined criteria can be established for maintaining a white balance setting in the second digital image that is substantially the same as that of the first digital image (step 420 in FIG. 4). Three examples are shown, without limitation, in FIGS. 6A-6C, in accordance with illustrative embodiments of the invention.

Figure 6A:
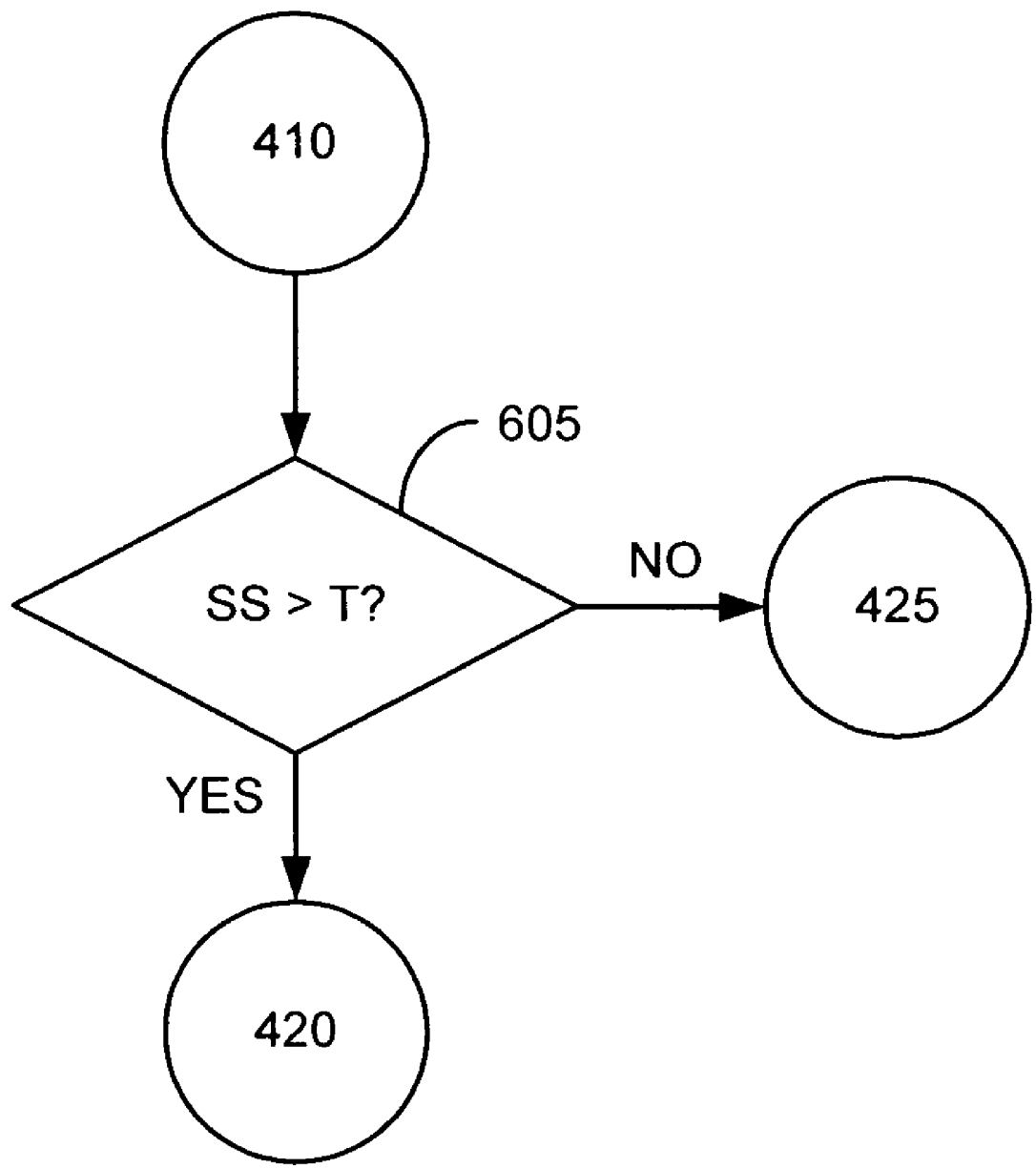
FIG. 6A is a flowchart of a method for determining whether a similarity score satisfies predetermined criteria, in accordance with an illustrative embodiment of the invention.

FIG. 6A is a flowchart of a method for determining whether a similarity score satisfies predetermined criteria, in accordance with an illustrative embodiment of the invention. In the illustrative embodiment of FIG. 6A, the similarity score (SS) is compared to a predetermined threshold (T) at 605. If SS exceeds the predetermined threshold T, the first and second digital images are presumed to be sufficiently similar to justify maintaining substantially the same white balance setting in the second digital image as in the first digital image.

Figure 6B:
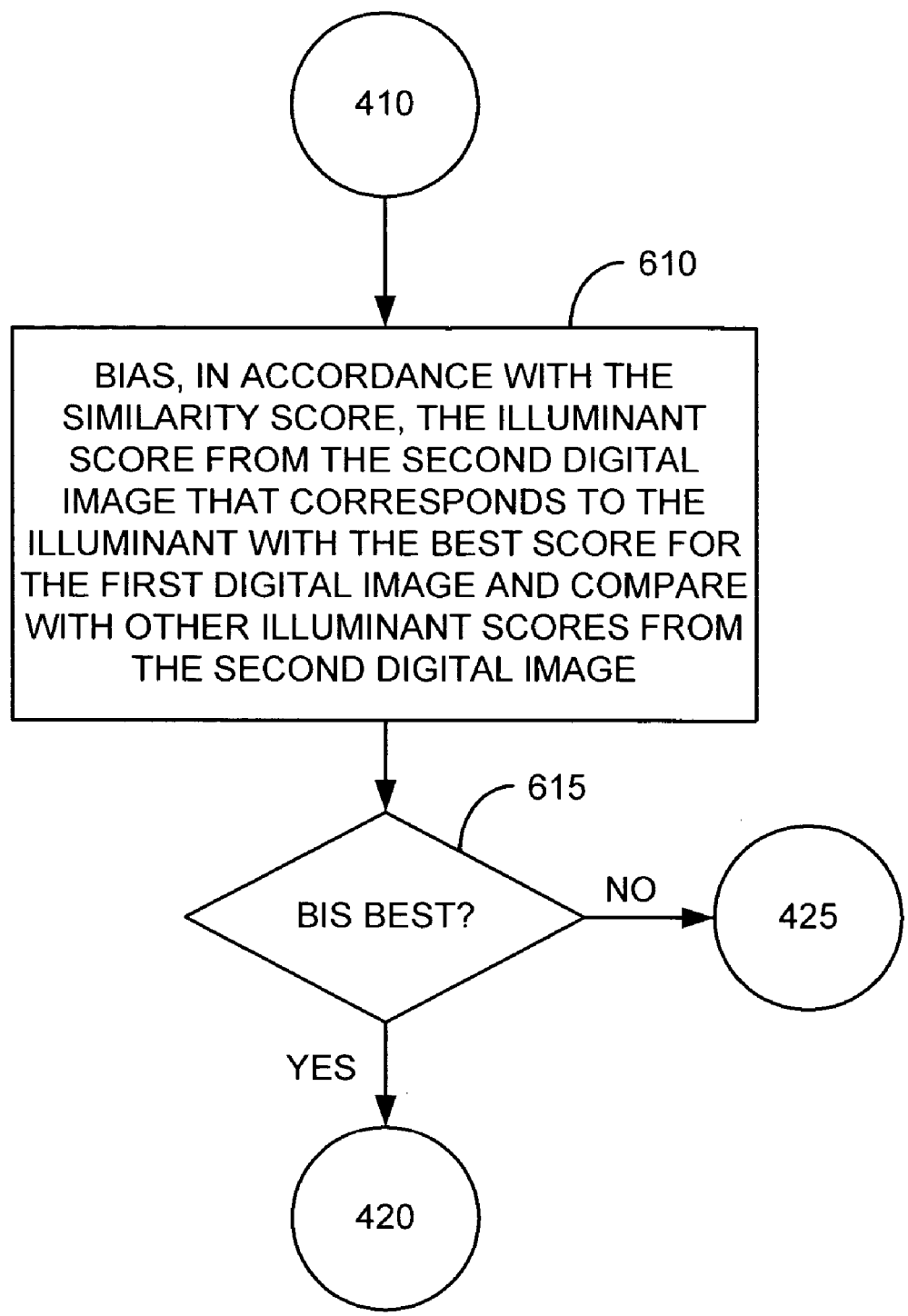
FIG. 6B is a flowchart of a method for determining whether a similarity score satisfies predetermined criteria, in accordance with another illustrative embodiment of the invention.

FIG. 6B is a flowchart of a method for determining whether a similarity score satisfies predetermined criteria, in accordance with another illustrative embodiment of the invention. The approach shown in FIG. 6B is to bias, in accordance with the similarity score, a particular illuminant score from the second digital image (i.e., the digital image later in time) and to compare that biased illuminant score with the other illuminant scores from the second digital image. An illuminant score is a figure of merit that white balance control logic 150 may use in assessing the likelihood that a particular illuminant (e.g., tungsten, fluorescent, incandescent) is present in a scene. As those skilled in the art will recognize, the various illuminants correspond to different color temperatures. The particular illuminant score that gets biased is the one whose illuminant had the best (e.g., highest) illuminant score for the first (earlier) digital image. If the biased illuminant score (BIS) is better than the other illuminant scores associated with the second digital image at 615, the white balance setting in digital imaging device 100 may be maintained substantially the same in the second digital image as in the first digital image (step 420 in FIG. 4). Otherwise, the process may proceed to step 425 in FIG. 4.

Figure 6C:
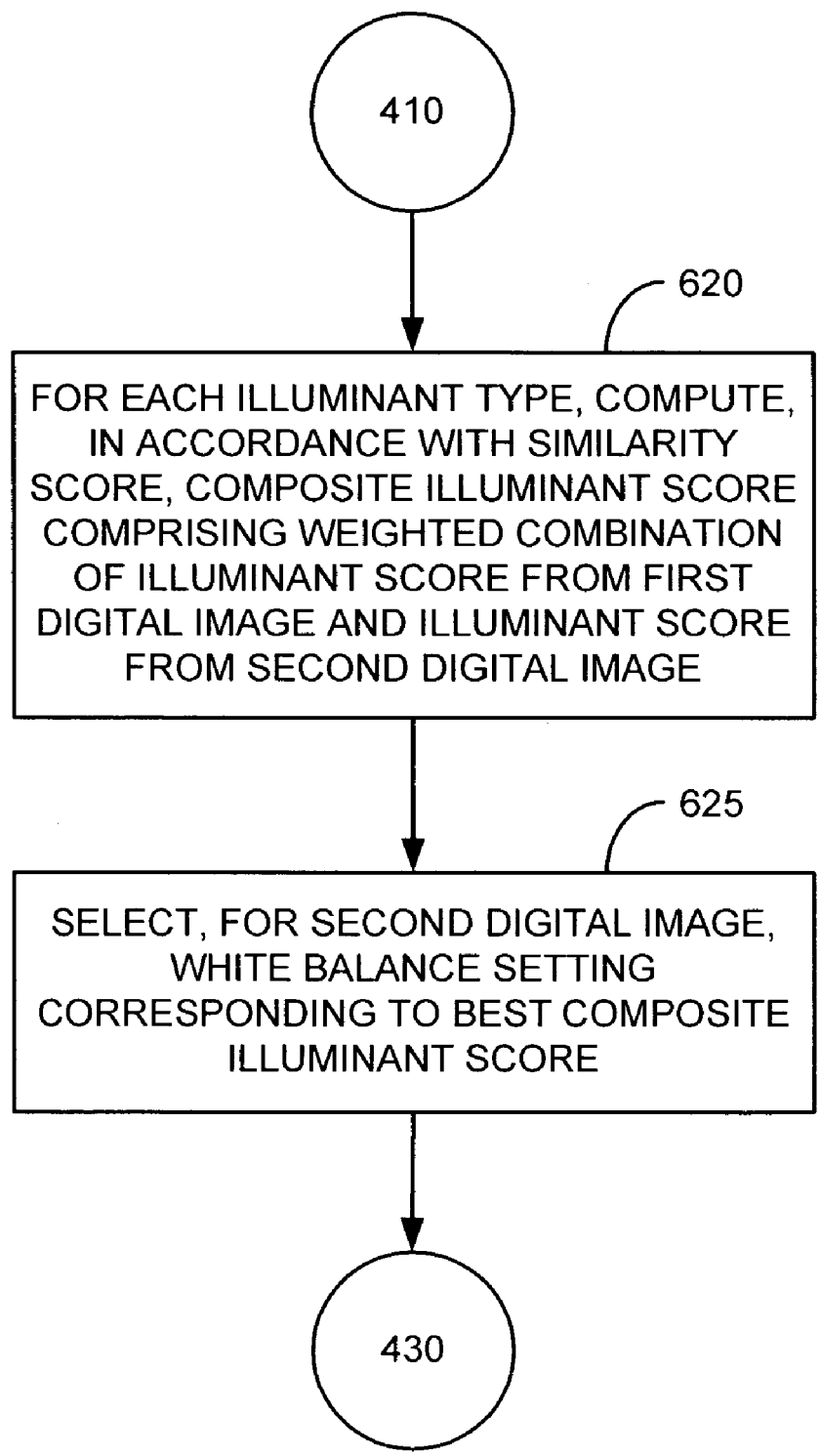
FIG. 6C is a flowchart of a method for determining whether a similarity score satisfies predetermined criteria, in accordance with yet another illustrative embodiment of the invention.

FIG. 6C is a flowchart of a method for determining whether a similarity score satisfies predetermined criteria, in accordance with yet another illustrative embodiment of the invention. Rather than taking an "either/or" approach, the method shown in FIG. 6C combines illuminant scores from the first and second digital images, weighting them based on the similarity score computed at step 410 in FIG. 4. At 620, for each possible illuminant type, a composite illuminant score is computed as a weighted combination of the respective illuminant scores corresponding to that illuminant type from the first and second digital images. The weighting is applied to the illuminant scores from the first and second digital images in accordance with the similarity score. White balance control logic 150 may, at 625, select, for the second digital image, a white balance setting corresponding to the illuminant having the best composite illuminant score.

FIG. 6D illustrates one approach to computing a composite illuminant score in conjunction with the method shown in FIG. 6C, in accordance with an illustrative embodiment of the invention. In the example of FIG. 6D, there are five possible illuminant types 630. White balance control logic 150 determines, for each illuminant type 630, an illuminant score for the first digital image (IS1 635) and an illuminant score for the second digital image (IS2 640). A composite illuminant score 645 that takes into account the similarity score computed at step 410 in FIG. 4 and the individual illuminant scores 635 and 640 may be computed as (BIAS*IS1+IS2)/(BIAS+1), where BIAS is a scale factor that is related to the similarity score. In FIG. 6D, three separate cases corresponding to different values of BIAS are shown. When BIAS is 1.2 (indicating a moderate degree of similarity between the first and second digital images), the composite illuminant scores 645 are biased somewhat, but not strongly, toward the illuminant scores associated with the first digital image (IS1 635). In this case, the most likely illuminant choice for the second digital image is Illuminant 2 with a composite illuminant score 645 of 95. When BIAS is 10 (indicating a high degree of similarity between the first and second digital images), the composite illuminant scores 645 are clearly skewed toward the illuminant scores associated with the first digital image (IS1 635). In this case, the most likely illuminant choice for the second digital image is Illuminant 3 with a composite illuminant score 645 of 97.27. This case is also an example of the similarity score satisfying predetermined criteria for maintaining substantially the same white balance in the second digital image as in the first digital image at step 415 in FIG. 4. When BIAS is 0.1 (indicating a low degree of similarity between the first and second digital images), the composite illuminant scores 645 are clearly skewed toward the illuminant scores associated with the second digital image (IS2 640). In this case, the most likely illuminant choice for the second digital image is Illuminant 5 with a composite illuminant score 645 of 96.36. This case is also an example of the similarity score not satisfying predetermined criteria for maintaining substantially the same white balance in the second digital image as in the first digital image at step 415 in FIG. 4. Many variations of weighted combining are possible. The particular approach shown in FIG. 6D is merely one example.

The foregoing description of the present invention has been presented for the purposes of illustration and description. It is not intended to be exhaustive or to limit the invention to the precise form disclosed, and other modifications and variations may be possible in light of the above teachings. The embodiments were chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention except insofar as limited by the prior art.

What is claimed is:

1. A method for maintaining consistency in white balance between a first digital image and a second digital image captured by a digital imaging device, comprising:

capturing the first and second digital images from a scene illuminated by at least two different illuminants;

identifying which of the at least two different illuminants to base a white balance setting;

comparing the first and second digital images to compute a similarity score; and maintaining a white balance setting based on the identified illuminant in the second digital image that is substantially the same as that of the first digital image, when the similarity score satisfies predetermined criteria, even if another illuminant is dominant in the second digital image.

2. The method of claim 1, wherein first and second reduced-resolution digital images are created from the first and second digital images, respectively, and the first and second reduced-resolution images are compared to compute the similarity score.

3. The method of claim 1, wherein comparing the first and second digital images to compute a similarity score comprises constructing a probability vector for each of the first and second digital images and comparing the probability vectors.

4. The method of claim 3, wherein each probability vector is one of a binary and an integer probability vector.

5. The method of claim 1, wherein the predetermined criteria comprise the similarity score exceeding a predetermined threshold.

6. The method of claim 1, wherein the predetermined criteria comprise a biased illuminant score associated with the second digital image exceeding other illuminant scores associated with the second digital image, the biased illuminant score comprising an illuminant score from the second digital image that is biased in accordance with the similarity score, the biased illuminant score corresponding to an illuminant whose illuminant score was best among those associated with the first digital image.

7. The method of claim 1, wherein the predetermined criteria comprise a composite illuminant score exceeding other composite illuminant scores, each composite illuminant score comprising, for a given illuminant type, a weighted combination of an illuminant score associated with the first digital image and an illuminant score associated with the second digital image, the illuminant scores associated with the first and second digital images being weighted in accordance with the similarity score.

8. A method for maintaining consistent white balance between digital images captured by a digital imaging device, comprising:

capturing first and second digital images, each pixel of the first and second digital images having red (R), green (G), and blue (B) color components;

constructing a two-dimensional probability vector for each of the first and second digital images by computing quantized R/G and B/G color ratios for each pixel, using the quantized color ratios as a combination of indices to address a unique location within the probability vector, and recording a first binary symbol at the unique location, locations within the probability vector corresponding to combinations of indices that fail to occur containing a second binary symbol that is logically opposite the first binary symbol;

computing a similarity score between the first and second digital images by dividing the number of locations for which both probability vectors contain the first binary symbol by the total number of first binary symbols contained in the probability vector containing the greater number of first binary symbols; and maintaining a white balance setting in the second digital image that is substantially the same as that of the first digital image, when the similarity score satisfies predetermined criteria.

9. The method of claim 8, wherein the first and second digital images comprise reduced-resolution digital images derived from first and second higher-resolution digital images, respectively.

10. The method of claim 8, wherein the predetermined criteria comprise the similarity score exceeding a predetermined threshold.

11. The method of claim 8, wherein the predetermined criteria comprise a biased illuminant score associated with the second digital image exceeding other illuminant scores associated with the second digital image, the biased illuminant score comprising an illuminant score from the second digital image that is biased in accordance with the similarity score, the biased illuminant score corresponding to an illuminant whose illuminant score was best among those associated with the first digital image.

12. The method of claim 8, wherein the predetermined criteria comprise a composite illuminant score exceeding other composite illuminant scores, each composite illuminant score comprising, for a given illuminant type, a weighted combination of an illuminant score associated with the first digital image and an illuminant score associated with the second digital image, the illuminant scores associated with the first and second digital images being weighted in accordance with the similarity score.

13. A method for maintaining consistent white balance between digital images captured by a digital imaging device, comprising:

capturing first and second digital images, each pixel of the first and second digital images having red (R), green (G), and blue (B) color components;

construction a two-dimensional probability vector for each of the first and second digital images by computing quantized R/G and B/G color ratios for each pixel, using the quantized color ratios as a combination of indices to address a unique location within the probability vector, and recording at the unique location the number of occurrences of the combination of indices, locations within the probability vector corresponding to combinations of indices that fail to occur containing a zero;

computing a similarity score between the first and second digital images by dividing the number of overlapping occurrences between the probability vectors by the total number of pixels in either of the first and second digital images; and maintaining a white balance setting in the second digital image that is substantially the same as that of the first digital image, when the similarity score satisfies predetermined criteria.

14. The method of claim 13, wherein the first and second digital images comprise reduced-resolution digital images derived from first and second higher-resolution digital images, respectively.

15. The method of claim 13, wherein the predetermined criteria comprise the similarity score exceeding a predetermined threshold.

16. The method of claim 13, wherein the predetermined criteria comprise a biased illuminant score associated with the second digital image exceeding other illuminant scores associated with the second digital image, the biased illuminant score comprising an illuminant score from the second digital image that is biased in accordance with the similarity score, the biased illuminant score corresponding to an illuminant whose illuminant score was best among those associated with the first digital image.

17. The method of claim 13, wherein the predetermined criteria comprise a composite illuminant score exceeding other composite illuminant scores, each composite illuminant score comprising, for a given illuminant type, a weighted combination of an illuminant score associated with the first digital image and an illuminant score associated with the second digital image, the illuminant scores associated with the first and second digital images being weighted in accordance with the similarity score.

18. A digital imaging device, comprising:
an imaging module to capture first and second digital images;
white balance control logic configured to compare the first and second digital images and compute a similarity score; and
wherein the white balance control logic is further configured to maintain a white balance setting in the second digital image that is substantially the same as that of the first digital image based on an identified illuminant for the first digital image even if another illuminant is dominant in the second digital image, when the similarity score satisfies predetermined criteria.

19. The digital imaging device of claim 18, wherein the digital imaging device is configured to create first and second reduced-resolution digital images from the first and second digital images, respectively, and the white balance control logic is configured to compare first and second probability vectors associated with the first and second reduced-resolution images, respectively, to compute the similarity score.

20. The digital imaging device of claim 18, wherein the predetermined criteria comprise the similarity score exceeding a predetermined threshold.

21. The digital imaging device of claim 18, wherein the predetermined criteria comprise a biased illuminant score associated with the second digital image exceeding other illuminant scores associated with the second digital image, the biased illuminant score comprising an illuminant score from the second digital image that is biased in accordance with the similarity score, the biased illuminant score corresponding to an illuminant whose illuminant score was best among those associated with the first digital image.

22. The digital imaging device of claim 18, wherein the predetermined criteria comprise a composite illuminant score exceeding other composite illuminant scores, each composite illuminant score comprising, for a given illuminant type, a weighted combination of an illuminant score associated with the first digital image and an illuminant score associated with the second digital image, the illuminant scores associated with the first and second digital images being weighted in accordance with the similarity score.

23. The digital imaging device of claim 18, wherein the digital imaging device comprises one of a digital camera, a digital camcorder, a personal digital assistant, and a radiotelephone.

24. A digital imaging device, comprising:
means for capturing first and second digital images illuminated by at least two different illuminants;
means for identifying which of the at least two different illuminants to base a white balance setting;
means for comparing the first and second digital images to compute a similarity score and to maintain the white balance setting based on the identified illuminant in the second digital image that is substantially the same as that of the first digital image, when the similarity score satisfies predetermined criteria, even if another illuminant is dominant in the second digital image.

* * * * *

UNITED STATES PATENT AND TRADEMARK OFFICE
CERTIFICATE OF CORRECTION

| | | |
|---|---|---|
| PATENT NO. | : 7,505,069 B2 | Page 1 of 1 |
| APPLICATION NO. | : 11/259848 | |
| DATED | : March 17, 2009 | |
| INVENTOR(S) | : Yu-Wei Wang | |

It is certified that error appears in the above-identified patent and that said Letters Patent is hereby corrected as shown below:

In column 8, line 36, in Claim 13, delete "construction" and insert -- constructing --, therefor.

Signed and Sealed this

First Day of September, 2009

David J. Kappos
*Director of the United States Patent and Trademark Office*